United States Patent [19]

Shishkin

[11] Patent Number: 4,899,489

[45] Date of Patent: Feb. 13, 1990

[54] DEVICE FOR GROWING PLANTS

[75] Inventor: Viktor V. Shishkin, Krasnodar, U.S.S.R.

[73] Assignee: Ibzhenerny Tsentr "Truboprovod", Krasnodar, U.S.S.R.

[21] Appl. No.: 112,563

[22] PCT Filed: Dec. 17, 1986

[86] PCT No.: PCT/SU86/00132

§ 371 Date: Jul. 27, 1987

§ 102(e) Date: Jul. 27, 1989

[87] PCT Pub. No.: WO87/03777

PCT Pub. Date: Jul. 2, 1987

[30] Foreign Application Priority Data

Dec. 24, 1985 [SU] U.S.S.R. .............. 3989055
Dec. 24, 1985 [SU] U.S.S.R. .............. 3988673

[51] Int. Cl.[4] .................. A01G 9/00; A01G 31/00
[52] U.S. Cl. ............................. 47/65; 47/17; 111/200
[58] Field of Search ............ 47/17, 19, 28.1, 29, 47/65; 198/812, 861.1; 305/34; 604/271

[56] References Cited

U.S. PATENT DOCUMENTS 3,178,732 3/1962 Stibitz ........................ 305/34
3,757,788 9/1973 Renfroe ..................... 604/271
4,291,499 9/1981 Prewer ....................... 47/28.1

FOREIGN PATENT DOCUMENTS 0897175 1/1982 U.S.S.R. .
0969211 11/1982 U.S.S.R. .
0988241 1/1983 U.S.S.R. .
1545275 5/1979 United Kingdom .
2075323 11/1981 United Kingdom .

Primary Examiner—Dennis L. Taylor
Assistant Examiner—Jeffrey L. Thompson
Attorney, Agent, or Firm—Burgess Ryan and Wayne

[57] ABSTRACT

The device comprises a hermetically sealed chamber (1) whose interior space accommodates a perforated band (3) held to a drive drum (2). Part of the chamber (1) is made as a flexible tubing (4) one end of which is connected to the free end of the perforated band (3), and the other end is turned inside out and held peripherally in the chamber (1) to form a hermetically sealed space (11) along therewith. The interior space (11) of the chamber (1) is connected to the working agent and nutrient medium feeding systems (8,9).

4 Claims, 2 Drawing Sheets

DEVICE FOR GROWING PLANTS

TECHNICAL FIELD

This invention relates generally to the farming industry and is concerned, more specifically, with a device for growing plants under natural conditions or in an artificial environment, in particular, on protected or open ground.

The invention finds application for growth of plants directly on the surface of water basins or reservoirs, or deeply in the water thereof. The invention makes it possible to grow plants on various abandoned lands, marshlands, roofs of production or residential buildings, in abandoned mine workings, as well as in mines and collieries.

In addition, the invention can be used for growing biological products (such as algae, molluscs, fish, etc.) in an aqueous medium, as well as in the outer space.

BACKGROUND OF THE INVENTION

Known in art is a device for growing plants, comprising a container accommodating layers of an organomineral root medium and a fine-grained water-permeable material, separated by a perforated partition, and a reservoir containing a nutrient solution, communicating with the container (cf. USSR Inventor's Certificate No. 988,241, Int.Cl. A01G 31/00).

However, the aforementioned device fails to provide an efficient use of the nutritive salts contained in the nutrient solution, since the holes in the perforated partition can get clogged with the plants' roots, root discharges and salt deposits, which results in disturbed water-salt metabolism and aeration of the plants.

A prior-art installation for soil-free growing of plants in a waterproof container is known to comprise a network carrying a matting material for the plant roots, a device for feeding plant roots with a nutrient solution, and a means for mist formation, communicating with the container (cf. USSR Inventor's Certificate No. 897,175, Int.Cl. A01G 31/02, 1982).

A disadvantage inherent in said installation resides in its restricted technological capabilities, since it is applicable for plant growing under stationary conditions only.

Another prior-art device for growing plants is known to comprise a hermetically sealed chamber, accommodating a perforated band mounted on a driven drum, respective systems for feeding nutrient solution and working agent to the chamber, and a perforated band cleaning element (cf. USSR Inventor's Certificate No. 969,211, Int.Cl. A01G 31/02, 1981).

The aforementioned device suffers from low productivity and restricted technological capabilities, since it is applicable under stationary conditions only. Besides, planting and harvesting are carried out manually, which substantially affects the productivity of the device. The plant growing area is constant, which renders the device inapplicable for use in various media and does not allow the planting area in the chamber to be changed whenever necessary.

SUMMARY OF THE INVENTION

The main object of the present invention is to provide a device for growing plants construction of which would allow one to change planting area in the chamber.

The aforesaid object is accomplished by a device for growing plants, comprising a hermetically sealed chamber, accommodating a perforated band mounted on a driven drum, and systems for feeding nutrient solution and working agent to the chamber, according to the invention, part of the chamber is fashioned as a flexible tubing whose one end is connected to the free end of the perforated band, while the other end thereof is turned inside out and held in place peripherally in the chamber to form a hermetically sealed space along therewith.

The proposed invention provides for changing the size of the planted area, depending on the length of the tubing, and makes it possible to establish the planted area on practically any surface, which extends the technological capabilities of the device. Thanks to the fact that planting and harvesting are carried out from the same position, i.e., when inflating the tubing and reeling it onto the drum, respectively, the productivity of the device is increased and its operation and maintenance is made more convenient.

Since the tubing is moved by virtue of the working agent, both planting and harvesting can be carried out automatically, which makes the planted area adjustable for size. A possibility of preparing any planting mixture composition is contributory to better plant growth conditions.

The tubing is made of a heat-absorbing material, such as polyethylene which is capable of accumulating the solar energy, which makes it possible to considerably cut down power consumption involved in plant heating.

According to one of the embodiments of the invention, the perforated band is shaped as a trough featuring positive buoyancy. Such an embodiment is applicable in the case of a liquid nutrient medium.

BRIEF DESCRIPTION OF THE DRAWINGS

Other objects and advantages of the present invention will become more understandable from the following detailed description of specific exemplary embodiments thereof with reference to the accompanying drawings, wherein.

BEST MODE FOR CARRYING OUT THE INVENTION

Figure 1:
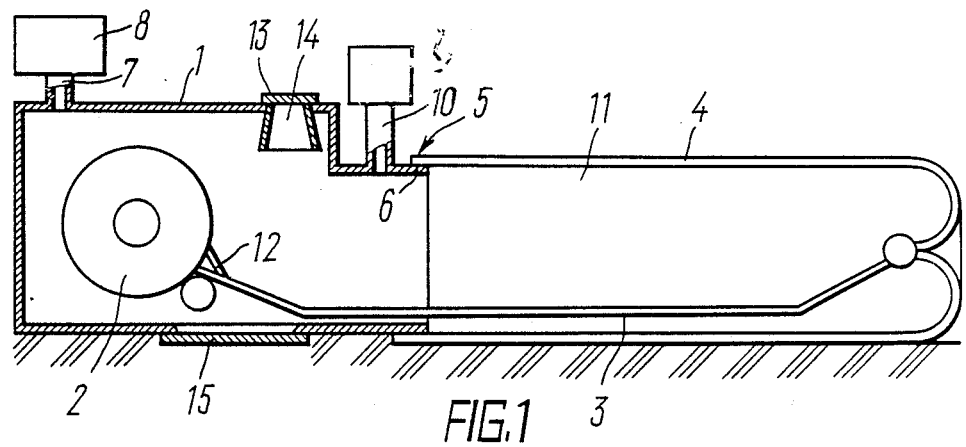
FIG. 1 is a longitudinal sectional view of schematic diagram of a device for growth of plants, using a dry nutrient medium.

The device comprises a hermetically sealed chamber 1 (FIG. 1) whose interior accommodates a driven drum 2. A perforated band 3 is wound on the drum 2. Part of the chamber 1 is shaped as a flexible tubing 4 wound on the drum 2. One end of the tubing 4 communicates with the free end of the perforated band 3, while the other end 5 is turned inside out and held peripherally to a sleeve 6 of the chamber 1.

The band 3 may be fashioned as a net. The chamber 1 is connected, through a sleeve 7, to a working agent feeding system, said working agent being either a compressed gas or gaseous medium of a preset composition. A nutrient medium feeding system 9 (said medium consisting of a nutrient solution, water, a dry nutrient mixture, etc.) communicates, through a sleeve 10, with an interior space 11 of the chamber 1. A knife 12 is provided close to the drum 2 and adapted to interact with the band 3. The drum 2 can be turned from a horizontal to a vertical plane. The housing of the chamber 1 is provided with a detachable cover 13, wherein a funnel 14 is provided for seeded soil to feed into the chamber 1. A removable lid 15 of the discharge opening in the bottom of the chamber 1 is provided to remove the harvested plants.

The device operates as follows.

Before operation the drum 2 is set horizontally, and compressed air is fed into the chamber 1 through the sleeve 7 with the aid of the system 8. The tubing 4 starts moving and being unreeled from the drum 2. As soon as the entire tubing 4 is unwound from the drum 2, the band 3 starts unreeling off the drum; at the same time seeded soil is fed onto the band 3 through the funnel 14 of the cover 13.

Once the tubing 4 has been laid stretched throughout its length, the band 3 lies on the inner surface of the tubing as shown in FIG. 1, whereupon a required amount of the nutrient solution is pumped into the space 11 by the system 9.

In the course of plant growth a positive pressure of a preset-composition gaseous medium is established in the tubing 4, which pressure retains the tubing 4 in an inflated condition and contributes to an intense growth of plants. Periodically feeding a small amount of the working agent into the space 11 and discharging said agent therefore due to respective tensioning or slackening of the band 3, one can perform loosening of the soil immediately at the plant roots. Feeding water or a nutrient medium to the interior space 11 of the chamber 1, one can irrigate or feed the plants, respectively. Feeding a hot or cold gaseous working agent to the interior space 11 by the system 8, one can establish the required temperature conditions for the plants being grown. Upon reaching maturity by the plants, a certain amount of compressed air is additionally fed into the interior space 11 of the chamber 1 in order to inflate the tubing 4 to a greater extent. As a result, the band 3 is tensioned and the soil is forced therethrough and falls onto the tubing 4.

Thus, the plant roots are torn off the soil. Then compressed air is let out of the interior space 11 of the chamber 1 through the open cover 13. Next the drive of the drum 2 is engaged, and the band 3 starts to be reeled onto the drum along with the tubing 4. The gaseous medium is removed from the tubing 4 through the funnel 14 of the cover 13. As the band 3 is being reeled onto the drum 2 the knife 12 cuts the plants from the band 3. The cut-off plants are removed from the chamber 1 through the open lid 15 of the discharge opening. Once harvesting has been completed the soil is removed through the open lid 15 of the discharge opening due to the tubing 4 getting reeled onto the drum 2. Then the entire operating cycle of the device is repeated.

Figure 4:
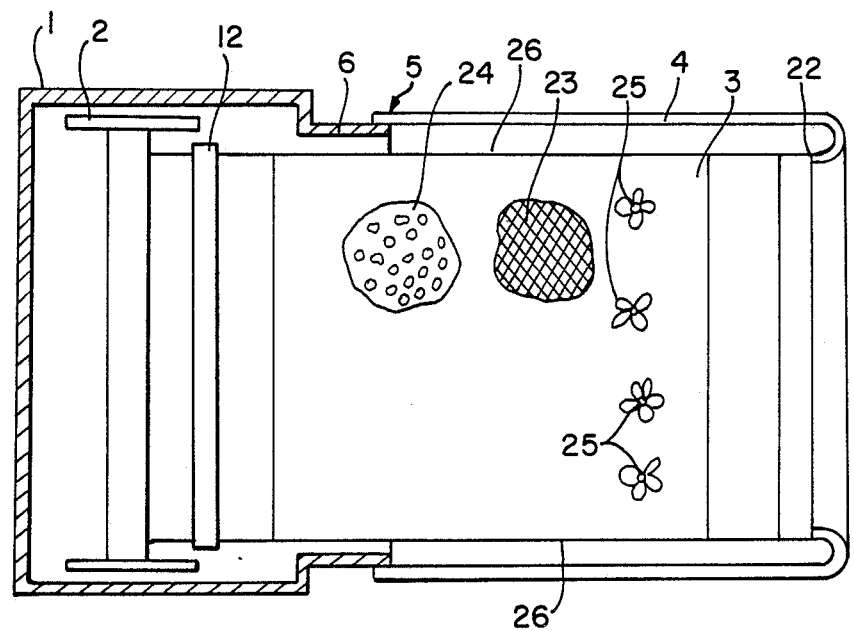
FIG. 4 is a plan view of the device of FIG. 1.

FIG. 4 is a plan view of FIG. 1 and shows sealed chamber 1 having tubing 4 turned inside out with end 5 held peripherally to sleeve 6. One end of flexible band 3 is connected to drum 2 and the free end 22 is attached to flexible tubing 4. The flexible band 3 passes under knife 12 so that when flexible band 3 is rolled onto driven drum 2, plants growing on flexible band 3 can be cut off. Flexible band 3 can comprise a net-like structure as shown at 23 or a perforated structure as shown at 24. The net or perforations permit the roots of growing plants 25 to enter the growth medium which is below the flexible band 3. The float means 17 shown in FIG. 2 would be attached to the edges 26 of flexible band 3 if the growth medium was a liquid growth medium.

Figure 2:
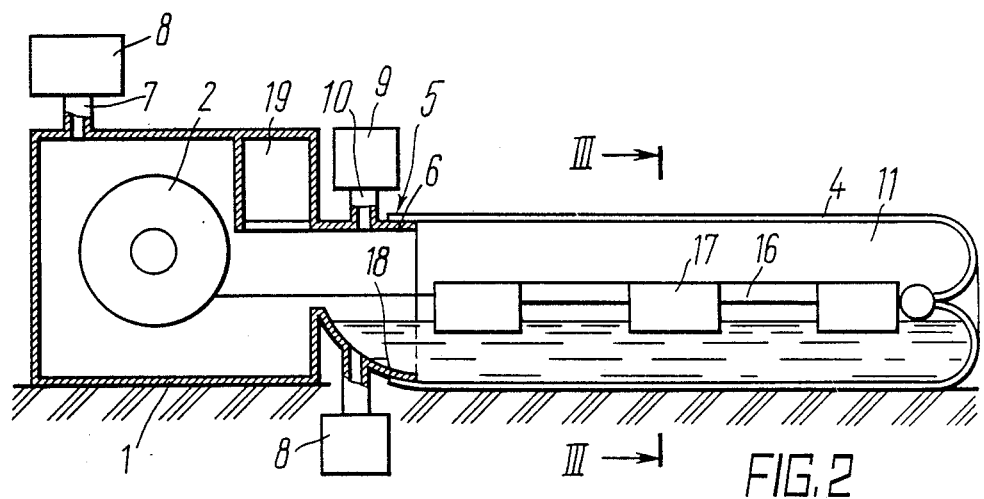
FIG. 2 is a longitudinal sectional view of an embodiment of the device, using a liquid nutrient medium, according to the invention.
Figure 3:
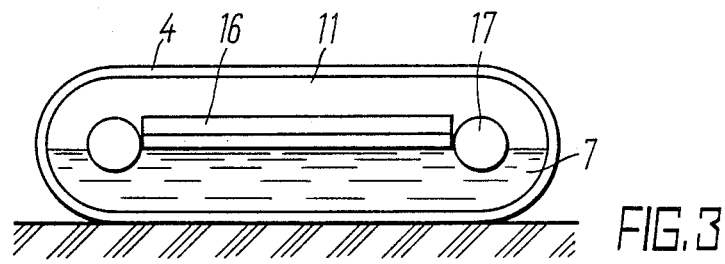
FIG. 3 is a section taken along the line III—III in FIG. 2.

FIG. 2 represents an embodiment of the device for growth of plants, wherein use is made of a liquid nutrient medium.

As distinct from the construction of the device shown in FIG. 1, the present embodiment of the device features the perforated band 3 shaped as a flexible perforated trough 16 provided with inflatable floats 17. The trough 16 may be of any other construction, but in any case it must feature positive buoyancy.

The sleeve 6 is provided with a partition 18 which partly closes its cross-sectional area. Part of the interior space 11 of the chamber 1 confined between the partition 18 and the tubing 4, communicates with the nutrient solution feeding system 9. The entire interior space 11 of the chamber 1 communicates with the working agent feeding system 8.

The chamber 1 is provided with a compartment 19 through which auxiliary operations are carried out, as well planting and harvesting.

The device operates as follows.

The working agent is delivered under pressure into the tubing 4 by the system 8, whereby the tubing 4 starts moving. Then a peat or other mixture containing seeds is poured into the flexible perforated trough 16 through the compartment 19. As soon as the whole tubing 4 is unwound the nutrient solution is fed into the tubing through the system 9 and the sleeve 10 in such an amount as to wet the peat mixture. The solution is to be replenished as it gets evaporated.

As the seeds germinate the floats 17 are inflated by any of the suitable techniques known at present, while the amount of the nutrient solution 21 fed is so adjusted that a gas layer be found between the peat layer and the solution in order to prevent the plant roots from rotting.

In the course of plant vegetation the composition of the nutrient solution 21 and the gaseous medium are adjusted with the aid of the systems 8 and 9. Once the plants have matured, the trough 16 is gradually reeled onto the driven drum 2, thus carrying out the harvesting.

The tubing 4 may be made from a transparent polymer material. The length of the tubing 4 is selected to suit the area of the space, wherein the device is to be located.

Industrial Applicability

The present invention can find the most utility when applied for growth of flowers, greens and etc. The invention makes it possible to grow plants on any suitable surface including the water surface, as well as deeply in water basins. Plants can also be grown in abandoned mine workings, e.g. mines.

I claim:

1. A device for growing plants, comprising: a hermetically sealed chamber (1) which accomodates a perforated flexible band (3) having one end mounted on a driven drum whereby said drum may be rotatably driven to reel said flexible band thereon, systems (8,9) for feeding working agent and nutrient solution respectively to the chamber (1) wherein the chamber (1) comprises a flexible tubing (4) whose one end is connected to a second end of the perforated band (3) the other end of the tubing being turned inside out and held in place peripherally on the chamber (1) to form a hermetically sealed space (11), said flexible tubing (4) arranged to be extended as the working agent is fed to the chamber and the perforated band tensioned as the flexible tubing is extended, wherein the tubing (4) and band (3) comprise a growing area.

2. A device for growing plants as claimed in claim 1, characterized in that the perforated band (3) is shaped as a trough (16) featuring positive buoancy.

3. A device for growing plants according to claim 1 wherein the perforated flexible band (3) comprises a trough (16) made of a resilient elastic material provided with an inflatable float means (17) along the periphery thereof.

4. A device for growing plants according to claim 3 wherein a sleeve (6), adjacent the plant growing area, comprises a partition (18) which partially closes the cross-sectional area of the flexible tubing (4) to form a container for the nutrient solution (21) in communication with the solution feeding system (9), whereby a part of the sealed space (11) is confined between the partition (18) and the tubing (4).

* * * * *